United States Patent [19]

Willoughby

[11] Patent Number: 5,050,629

[45] Date of Patent: Sep. 24, 1991

[54] EARTHQUAKE SHUTOFF VALVE

[76] Inventor: Morris T. Willoughby, 4048 Cecil Dr., Memphis, Tenn. 38116

[21] Appl. No.: 616,345

[22] Filed: Nov. 21, 1990

[51] Int. Cl.[5] .............................................. F16K 17/36
[52] U.S. Cl. ..................................................... 137/38
[58] Field of Search ............................. 137/38, 39, 45

[56] References Cited

U.S. PATENT DOCUMENTS

| | | | |
|---|---|---|---|
| 2,615,461 | 10/1952 | Crow | 137/39 |
| 3,965,917 | 6/1976 | Speck | 137/38 |
| 4,099,551 | 7/1978 | Billington et al. | 141/388 |
| 4,165,758 | 8/1979 | Douce | 137/38 |
| 4,742,839 | 5/1988 | Stock | 137/38 |
| 4,799,505 | 1/1989 | Nowell | 137/38 |
| 4,821,759 | 4/1989 | Diamond | 137/45 |
| 4,903,720 | 2/1990 | McGill | 137/38 |
| 4,971,094 | 11/1990 | Gonzalez | 137/38 |

*Primary Examiner*—Robert G. Nilson
*Attorney, Agent, or Firm*—Walker & McKenzie

[57] ABSTRACT

A valve for controlling the passage of fluid between a first conduit and a second conduit. A body has a first port for being coupled to the first conduit, has a second port for being coupled to the second conduit, and has a valve chamber joining the first and second ports. A gate is mounted within the valve chamber of the body for movement between an opened position in which fluid is allowed to pass between the first and second ports through the valve chamber and a closed position in which fluid is prevented from passing between the first and second ports through the valve chamber. A latch member is used to latch the gate in the open position. A first spring urges a portion of the latch member against a portion of the body when the latch member is in an extended position and the gate is in the opened position to hold the latch member in the extended position and to hold the gate in the opened position, and urges the gate to the closed position when the latch member is in the retracted position. A second spring urges the latch member to a retracted position when the valve is subjected to a predetermined amount of vibration.

8 Claims, 2 Drawing Sheets

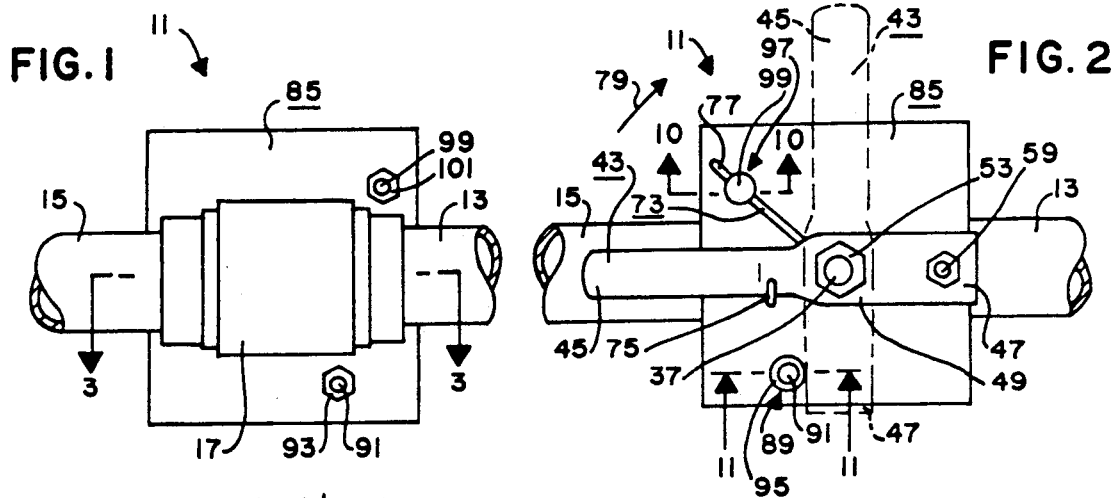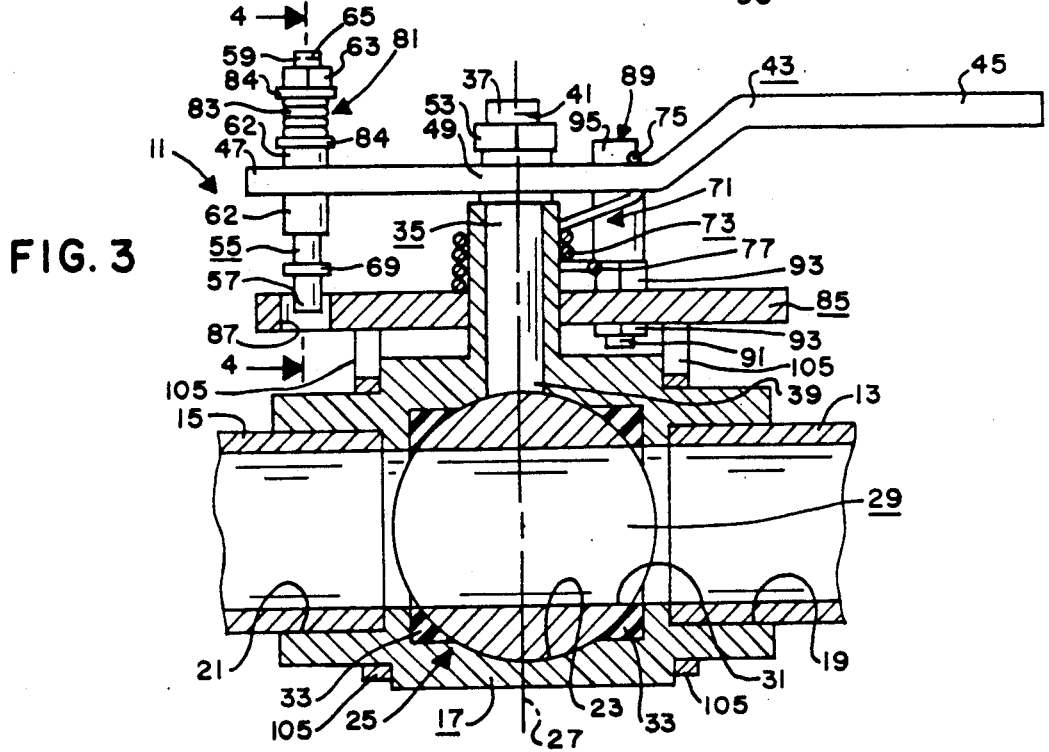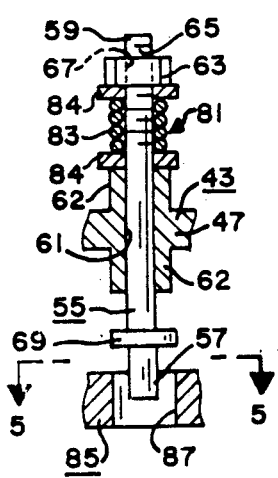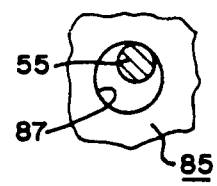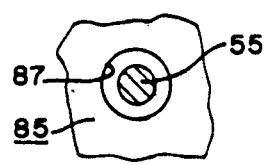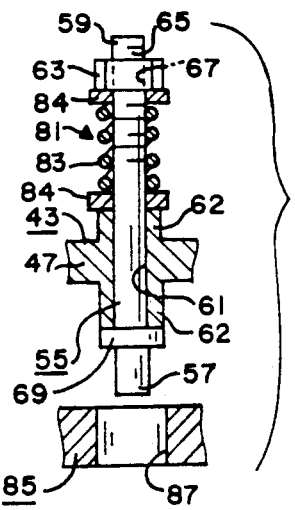

EARTHQUAKE SHUTOFF VALVE

BACKGROUND OF THE INVENTION

1. Field of the Invention

The present invention relates, in general, to a valve for closing a gas line in response to vibrations due to an earthquake or the like.

2. Information Disclosure Statement

A preliminary patentability search in class 137, subclass 38 produced the following patents which may relate to the present invention:

Speck, U.S. Pat. No. 3,965,917. Speck discloses an earthquake valve usable as a shut-off valve for a fluid conduit. The Speck valve includes a pair of reactant masses (substantially heavy lead weights or the like) loosely interlocked together and movably positioned within a housing mounted in the fluid conduit. Upon the housing receiving a shock of predetermined magnitude as the result of an earthquake or the like, the reactant masses will move relative to one another and will activate a spring loaded latching means to close the fluid conduit.

Billington et al., U.S. Pat. No. 4,099,551. Billington et al. discloses a multi-function valve operable, both manually and automatically, through a toggle fuselink joint to close the flow of LP gas through a filler hose between a bulk loading station and a LP gas truck. The Billington et al. valve is adapted to be closed manually by rotation of a handle or automatically by the melting of a fusible link in the event of a fire or by a cable or the like in the event the driver of a LP gas truck drives away from a bulk loading station without shutting off the valve or disconnecting the filler hose.

Douce, U.S. Pat. No. 4,165,758. Douce discloses an earthquake responsive valve having lever means mounted to swing about an axis and having two arms projecting in different directions and carrying two weights respectively balanced against one another in a relation such that one of the weights normally overbalances the other and retains the valve in an opened position but is displaceable by earthquake forces to move the valve to a closed position.

Stock, U.S. Pat. No. 4,742,839. Stock discloses a vibration or shake activated mechanism for operating a valve which has inlet and outlet ports and a valve disk rotatably mounted in a valve body. A spring interconnects the valve body and the valve disk to urge the valve body toward its closed position, and a trigger arm is movably connected with the valve body and has a catch tongue for engaging the valve disk to retain it in its open position. An inertial mass connected to the trigger arm and spaced from the catch tongue effects relative movement between the mass and the valve body to disengage the catch tongue from the valve disk to release it to rotate to its closed position.

Nowell, U.S. Pat. No. 4,799,505. Nowell discloses an earthquake triggered gas valve including a valve member having an axial valve rod. The valve member is forced open by a ball propped between the end of the valve rod and a retractable post in the conical floor of the valve outlet chamber. The ball is at least partially filled with a dense fluid such as mercury which has an inertia that will oppose that of an earthquake moved valve housing. The ball will thus be dislodged to permit the valve to close.

Nothing in the prior art discloses or suggests the present invention. More specifically, nothing in the prior art discloses or suggests a valve including, in general, a valve body having a first port for being coupled to a first conduit, having a second port for being coupled to a second conduit, and having a valve chamber joining the first and second ports; a valve gate mounted within the valve chamber f the valve body for movement between an opened position in which fluid is allowed to pass between the first and second ports through the valve chamber and a closed position in which fluid is prevented from passing between the first and second ports through the valve chamber; a latch member having an extended position and a retracted position; first urging means for urging a portion of the latch member against a portion of the valve body when the latch member is in the extended position and the valve gate is in the opened position to hold the latch member in the extended position and to hold the valve gate in the opened position, and for urging the valve gate to the closed position when the latch member is in the retracted position; and second urging means for urging the latch member to the retracted position when the valve is subjected to a predetermined amount of vibration.

SUMMARY OF THE INVENTION

The present invention is directed toward providing an improved valve for automatically shutting off the flow of fluid such as natural gas though a pipe line in the event of an earthquake or the like. The concept of the present invention is to provide a valve with a latch member having an extended position for holding the valve in an opened position and a retracted position for allowing the valve to move to a closed position, and urging means for normally urging the latch member to the extended position and for urging the latch member to the retracted position if the valve is subjected to a predetermined amount of vibration.

The valve of the present invention includes, in general, a valve body having a first port for being coupled to a first conduit, having a second port for being coupled to a second conduit, and having a valve chamber joining the first and second ports; a valve gate mounted within the valve chamber of the valve body for movement between an opened position in which fluid is allowed to pas between the first and second ports through the valve chamber and a closed position in which fluid is prevented from passing between the first and second ports through the valve chamber; a latch member having an extended position and a retracted position; first urging means for urging a portion of the latch member against a portion of the valve body when the latch member is in the extended position and the valve gate is in the opened position to hold the latch member in the extended position and to hold the valve gate in the opened position, and for urging the valve gate to the closed position when the latch member is in the retracted position; and second urging means for urging the latch member to the retracted position when the valve is subjected to a predetermined amount of vibration.

BRIEF DESCRIPTION OF THE DRAWINGS

FIG. 1 is a rear elevational view of the valve of the present invention shown in an opened position.

FIG. 2 is a front elevational view of the valve of the present invention shown in an opened position in solid lines and a closed position in broken lines.

FIG. 3 is an enlarged sectional view substantially as taken on line 3—3 of FIG. 1 with the valve gate in an opened position.

FIG. 4 is an enlarged sectional view substantially as taken on line 4—4 of FIG. 3 with the latch member in an extended position.

FIG. 5 is a sectional view substantially as taken on line 5—5 of FIG. 4.

FIG. 6 is a sectional view substantially similar to FIG. 5 but with certain components thereof shown in a moved position due to vibration of the valve.

FIG. 7 is a sectional view substantially similar to FIG. 4 but with the latch member in a retracted position.

DESCRIPTION OF THE PREFERRED EMBODIMENT

Figure 8:
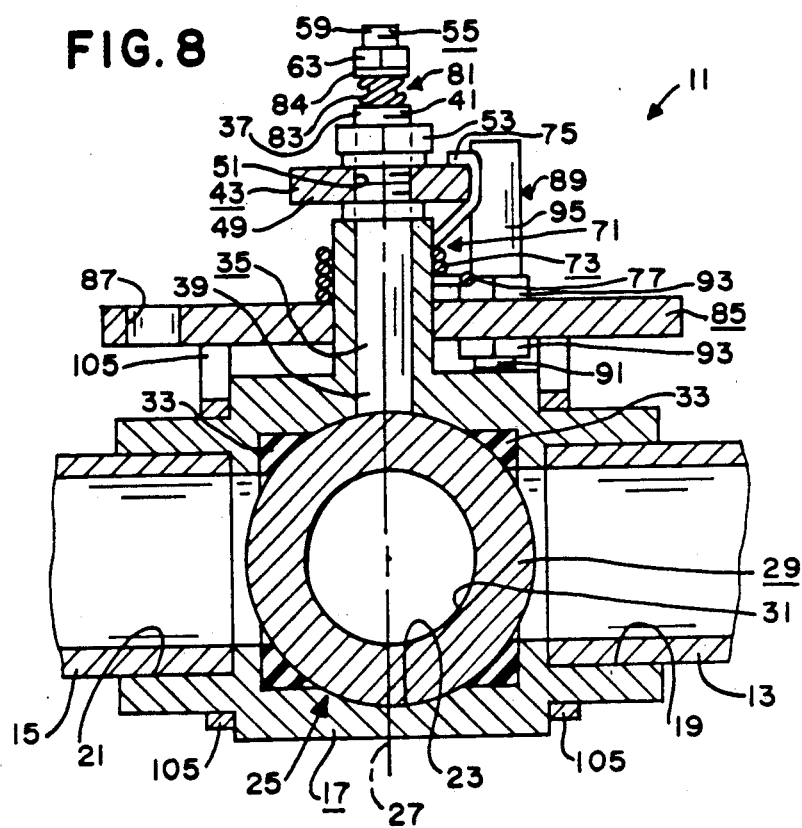
FIG. 8 is a sectional view similar to FIG. 3 but with the valve gate in a closed position.
Figure 9:
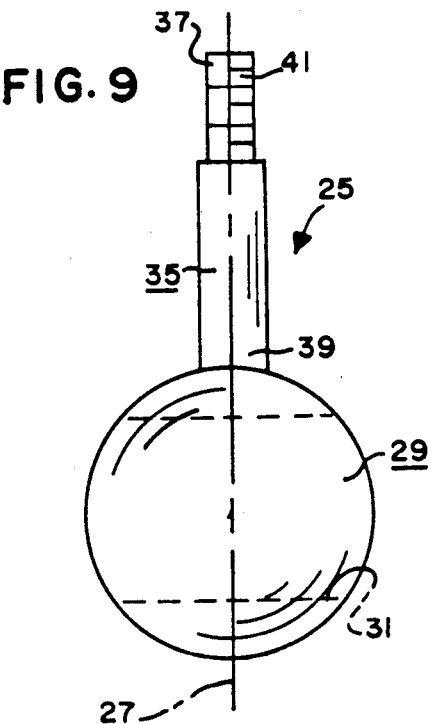
FIG. 9 is a side elevational view of the preferred valve gate and stem of the valve of the present invention.
Figure 10:
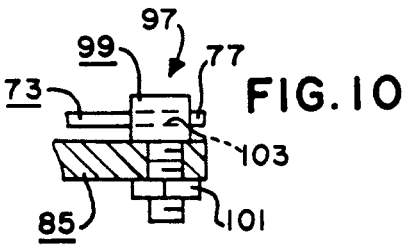
FIG. 10 is an enlarged sectional view substantially as taken on line 10—10 of FIG. 2.
Figure 11:
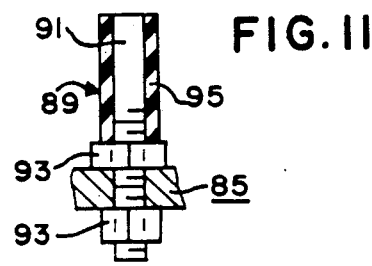
FIG. 11 is an enlarged sectional view substantially as taken on line 11—11 of FIG. 2 with portions thereof omitted for clarity.

The preferred embodiment of the valve of the present invention is shown in FIGS. 1-11 and identified by the numeral 11. The valve 11 is used to control the passage of fluid such as natural gas or the like between a first conduit 13 and a second conduit 15.

The valve 11 includes a valve body 17 having a first port 19 for being coupled to the first conduit 13, having a second port 21 for being coupled to the second conduit 15, and having a valve chamber 23 joining the first and second ports 19, 21. The ports 19, 21 may be internally threaded for allowing the conduits 13, 15 to be screwed thereon in a fluid-tight manner as will now be apparent to those skilled in the art.

The valve 11 includes a valve gate 25 mounted within the valve chamber 23 of the valve body 17 for movement between an opened position as shown in FIG. 3, in which fluid is allowed to pass between the first and second ports 19, 21 through the valve chamber 23 and a closed position as shown in FIG. 8, in which fluid is prevented from passing between the first and second ports 19, 21 through the valve chamber 23. Thus, movement of the valve gate 25 from the opened position to the closed position will stop and shut off the flow of fluid between the first and second conduits 13, 15. The valve gate 25 is preferably designed so that rotation thereof about an axis 27 through a 90 degree range is effective to move the valve gate 25 between the opened and closed positions. The valve gate 25 preferably includes a ball valve 29 having an axial aperture 31 therethrough. The aperture 31 is aligned with the first and second ports 19, 21 When the ball valve 29 is in the opened position as shown in FIG. 3 and is completely out of align with the first and second ports 19, 21 when the ball valve 29 is in the closed position as shown in FIG. 8. Both the valve chamber 23 and the ball valve 29 are preferably substantially spherical in shape and are substantially the same size so that the ball valve 29 will closely fit within the valve chamber 23. Seal members 33 such as typical 0-rings, washers, or the like are preferably provided between the valve chamber 23 and the ball valve 29 to provide a fluid-tight seal therebetween as will now be apparent to those skilled in the art. Such seal members 3 must be constructed of a material to withstand the type of fluid (e.g., natural gas) passing through the conduits 13, 17 as will now be apparent to those skilled in the art.

The valve 11 preferably includes a stem member 35 having a first end 37 and a second end 39. The stem member 35 is preferably fixedly attached to the valve gate 25 along the axis 27 so that rotation of the stem member 35 will cause the valve gate 25 to rotate between the opened and closed positions. Thus, the second end 39 of the stem member 35 is preferably fixedly attached to the ball valve 29 as clearly shown in FIG. 9. At least the distal portion of the first end 37 of the stem member 35 preferably has external threads 41 thereon for reasons which will hereinafter become apparent.

The valve 11 preferably includes a handle member 43 for being coupled to the valve gate 25. The handle member 43 is movable between a first or opened position as shown in solid lines in FIG. 2 and a second or closed position as shown in broken lines in FIG. 2 for moving the valve gate 25 between the opened position and the closed position, respectively. The handle member 43 preferably includes a first end 45, a second end 47, and a midportion 49. The first end 37 of the stem member 35 is preferably attached to the midportion 49 of the handle member 43 so that rotation of the handle member 43 will cause rotation of the stem member 35 and the ball valve 29. The stem member 35 may be attached to the handle member 43 in various manners as will now be apparent to those skilled in the art. Thus, for example, the midportion 49 of the handle member 43 may have an aperture 51 therethrough for allowing a portion of the first end 37 of the stem member 35 to extend therethrough, and a nut 53 may be provided for being screwed onto the external threads 41 of the first end 37 of the stem member 3 to fixedly secure the handle member 43 to the stem member 35 as will now be apparent to those skilled in the art.

The valve 11 includes a latch member 55 having an extended position as shown in FIG. 4 and a retracted position as shown in FIG. 7. The latch member 55 is designed to lock the valve gate 25 in the opened position until the valve 11 is subjected to a predetermined amount of vibration. The latch member 55 has a first end 57 and a second end 59. The second end 47 of the handle member 43 preferably has an aperture 61 within which the latch member 55 is slidably mounted with the first end 57 thereof positioned on one side of the handle member 43 and with the second end 59 thereof positioned on the other side of the handle member 43 as clearly shown in FIGS. 3, 4, and 7. The handle member 43 preferably includes a boss member 62 at each end of the aperture 61 for reinforcing the aperture 61, etc., as will now be apparent to those skilled in the art. The latch member 55 preferably includes a head member 63 attached to the second end 59 thereof. The second end 59 of the latch member 55 preferably has external threads 65 thereon and the head member 63 preferably has an internally threaded aperture 67 therein for being screwed onto the external threads 65 of the second end 5 of the latch member 55. The distance between the handle member 43 and the head member 63 can thus be adjusted by merely screwing the head member 63 along the second end 59 of the latch member 55 as will now be apparent to those skilled in the art. An enlarged portion such as a flange 69 or the like is preferably fixedly attached to the latch member 55 for coacting with the head member 63 to trap the latch member 55 on the handle member 43 and to limit movement of the latch member 55 between the extended and retracted positions. Thus, the flange 69 is positioned on the latch member 55 so as to abut one of the boss members 62 when the latch member 55 is in the retracted position as shown in FIG. 7 while the position of the head member 63 on the second end 59 of the latch member 55 will effectively cause the other boss member 62 to be abutted when the latch member 55 is in the extended position as shown in FIG. 4, as will now be apparent to those skilled in the art.

The valve 11 includes first urging means 71 for urging a portion of the latch member 55 against a portion of the valve body 17 when the latch member 55 is in the extended position and the valve gate 25 is in the opened position to hold the latch member 55 in the extended position and to hold the valve gate 25 in the opened position, and for urging the valve gate 25 to the closed position when the latch member 55 is in the retracted position. The first urging means 71 preferably includes a torsion spring 73 having a first end 75 for being coupled to the handle member 43 at a point between the first end 37 of the stem member 35 and the first end 45 of the handle member 43, and a second end 77 for being fixedly anchored relative to the valve body 17 whereby the torsion spring 73 will urge the handle member 43 to pivot about the axis 27 from the opened position to the closed position in the direction of the arrow 79 in FIG. 2. The first end 75 of the torsion spring 73 preferably includes a hook as clearly shown in FIG. 8 for hooking about a portion of the handle member 43 at a location between the first end 45 and the midportion 49 of the handle member 43.

The valve 11 includes second urging means 81 for urging the latch member 55 to the retracted position when the valve 11 is subjected to a predetermined amount of vibration such as when an earthquake of a predetermined magnitude occurs at the location of the valve 11. The second urging means 81 is preferably adjustable for varying the amount of vibration the valve 11 must be subjected to before the second urging means 81 will urge the latch member 55 to the retracted position. The second urging means 81 preferably includes a spring member for being positioned between the handle member 43 and the latch member 55 for urging the second end 59 of the latch member 55 away from the handle member 43. More specifically, the second urging means 81 preferably includes a coil spring 83 positioned about the latch member 55 and located between the handle member 43 and the head member 63 of the latch member 55 as clearly shown in FIGS. 4 and 7 for urging the second end 59 of the latch member 55 away from the handle member 43 as will now be apparent to those skilled in the art. Washers 84 are preferably positioned between the ends of the coil spring 83, the head member 63, and the handle member 43.

The valve body 17 preferably includes a face plate 85 having a cavity 87 therein for receiving the first end 57 of the latch member 55 when the latch member 55 is in the extended position. A portion of the first end 57 of the latch member 55 will be forced against a portion of the wall of the cavity 87, as clearly shown in FIG. 5, by the first urging means 71 when the latch member 55 is in the extended position and the valve gate 25 is in the opened position whereby friction between that portion of the first end 57 of the latch member 55 and that portion of the wall of the cavity 87 will hold the latch member 55 in the extended position and will hold the valve gate 25 in the opened position unless and until the valve 11 is subjected to vibration sufficient to cause the latch member 55 to pivot slightly away from the wall of the cavity 87 as shown in FIG. 6. The diameter of the cavity 87 is preferably larger than the diameter of the first end 57 of the latch member 55 as shown in FIGS. 5 and 6 to allow the latch member 55 to pivot slightly away from the wall of the cavity 87 as will now be apparent to those skilled in the art.

The valve 11 preferably includes stop means 89 for engaging the handle member 43 when the handle member 43 is in the closed position and for limiting movement of the valve gate 25. The stop means 89 may include a rod member 91 fixedly attached to the face plate by a pair of nuts 93 or the like as clearly shown in FIG. 11. A resilient cover 95 is preferably provided over the distal end of the rod member 91 for providing a bumper for the handle member 43. The resilient cover 95 may be frictionally attached to the rod member 91, etc.

The valve 11 preferably includes an attachment means 97 for attaching the second end 77 of the torsion spring 73 to the face plate 85. The attachment means 97 preferably includes a bolt 99 for being fixedly attached to the face plate 85 by a nut 101 as clearly shown in FIG. 10. The head of the bolt 99 preferably has an aperture 103 therethrough. The second end 77 of the torsion spring 73 preferably extends through the aperture 103 whereby the second end 77 of the torsion spring 73 is attached to the face plate 85 as will now be apparent to those skilled in the art.

The valve 11 may be constructed in various manners and out of various materials as will now be apparent to those skilled in the art. Thus, the valve body 17 may be cast out of metal with portions of the ports 19, 21, valve chamber 23, and cavity 87 machined therein. The face plate 85 may be constructed as a separate unit from the remainder of the valve body 17 and fixedly secured to the remainder of the valve body 17 by typical pipe clamps 105 or the like as will now be apparent to those skilled in the art. The ball valve 29 and stem member 35 may be machined out of metal as a one-piece, integral unit. The handle member 43 may be stamped or machined out of metal as will now be apparent to those skilled in the art. Various other elements including the nut 53, the head member 63, the torsion spring 73, the coil spring 83, the washers 84, the nuts 93, the bolt 99, the nut 101, and the pipe clamps 105 preferably consist of typical, off-the-shelf elements as will now be apparent to those skilled in the art.

The use and operation of the valve 11 is quite simple. The valve 11 is merely placed in a fluid pipe line at any location where it is desired to shutoff the flow of the fluid in the event of an earthquake or the like that subjects the valve 11 to a predetermined amount of vibration. To install the valve 11 at such a location, the pipe line is merely cut or otherwise separated, one end or conduit 13 of the pipe line is then attached to the first port 19 of the valve body 17, and the other end or conduit 15 of the pipe line is then attached to the second port 21 of the valve body 17. The valve 11 can then be opened to allow fluid to pass therethrough by manually turning the handle member 43 from the closed position to the opened position in the direction opposite the arrow 79 in FIG. 2. Then while holding the handle member 43 in the opened position, the latch member 55 is manually pushed from the retracted position to the extended position with the first end 57 of the latch member 55 positioned within the cavity 87. While holding the latch member 55 in the extended position, the handle member 43 is released to cause a portion of the first end 57 of the latch member 55 to be forced against a portion of the wall of the cavity 87 whereby friction between that portion of the first end 57 of the latch member 55 and that portion of the wall of the cavity 87 will hold the latch member 55 in the extended position. The latch member 55 can then be released and the valve 11 will remain in the opened position until and unless the valve 11 is subjected to vibration sufficient to cause the latch member 55 to pivot away from the wall of the cavity 87 a sufficient distance so that the force of the second urging means 81 will overcome the friction between the latch member 55 and the wall of the cavity 87 to urge the latch member 55 to the retracted position and allow the first urging means 71 to urge the valve gate 25 to the closed position, as will now be apparent to those skilled in the art. The valve 11 will then remain in the closed position until it is reopened by a externally applied force to the handle member 43. It should be noted that the valve 11 may be used in combination with a fire valve of any typical construction which will stop the flow of fluid through the conduits 13, 15 in the event of a fire or the like.

Although the present invention has been described and illustrated with respect to a preferred embodiment and a preferred use therefor, it is not to be so limited since modifications and changes can be made therein which are within the full intended scope of the invention.

I claim:

1. A valve for controlling the passage of fluid between a first conduit and a second conduit, said valve comprising:
   (a) a valve body having a first port for being coupled to said first conduit, having a second port for being coupled to said second conduit, and having a valve chamber joining said first and second ports;
   (b) a valve gate mounted within said valve chamber of said valve body for movement between an opened position in which fluid is allowed to pass between said first and second ports through said valve chamber and a closed position in which fluid is prevented from passing between said first and second ports through said valve chamber; said valve body including a face plate having a cavity therein;
   (c) a latch member having an extended position and a retracted position, said latch member having a first end and a second end;
   (d) first urging means for urging a portion of said latch member against a portion of said valve body when said latch member is in said extended position and said valve gate is in said opened position to hold said latch member in said extended position and to hold said valve gate in said opened position, and for urging said valve gate to said closed position when said latch member is in said retracted position; said first end of said latch member extending into said cavity of said face plate when said latch member is in said extended position and being forced against a portion of the wall of said cavity by said first urging means when said latch member is in said extended position and said valve gate is in said opened position to hold said latch member in said extended position and to hold said valve gate in said opened position;
   (e) second urging means for urging said latch member to said retracted position when said valve is subjected to a predetermined amount of vibration; said second urging means being adjustable for varying the amount of vibration said valve must be subjected to before said second urging means will urge said latch member to said retracted position;
   (f) a handle member coupled to said valve gate, said handle member being movable between a first position and a second position for moving said valve gate between said opened position and said closed position; said handle member including a first end, a second end, and a midportion; and
   (g) a stem member having a first end attached to said midportion of said handle member and having a second end attached to said valve gate for coupling said handle member to said valve gate.

2. The valve of claim 1 in which said first urging means includes a torsion spring having a first end and a second end, said first end of said torsion spring being coupled to said handle member at a point between said first end of said stem member and said first end of said handle member, said second end of said torsion spring being fixedly anchored relative to said valve body.

3. The valve of claim 2 in which said second end of said handle member has an aperture therethrough, and in which said latch member is slidably mounted in said aperture through said second end of said handle member with said first end of said latch member being positioned on one side of said handle member and with said second end of said latch member being positioned on the other side of said handle member.

4. The valve of claim 3 in which said second urging means includes a spring member positioned between said handle member and said latch member for urging said second end of said latch member away from said handle member.

5. The valve of claim 3 in which said latch member includes a head member attached to said second end thereof, and in which said second urging means includes a coil spring positioned about said latch member and located between said handle member and said head member of said latch member for urging said second end of said latch member away from said handle member.

6. The valve of claim 4 in which is included stop means for engaging said handle member and for limiting movement of said valve gate.

7. The valve of claim 6 in which said valve gate includes a ball valve having an aperture therethrough for being aligned with said first and second ports when said valve gate is in said opened position and for being out of alignment with said first and second ports when said valve gate is in said closed position.

8. The valve of claim 5 in which said second end of said latch member has external threads thereon, and in which said head member has an internally threaded aperture therein for being screwed onto said second end of said latch member.

* * * * *